J. W. LATIMER.
WATER TIGHT PIPE CONDUIT.
APPLICATION FILED NOV. 9, 1918. RENEWED AUG. 9, 1920.

1,371,632. Patented Mar. 15, 1921.

INVENTOR
John W. Latimer
BY
ATTORNEY

UNITED STATES PATENT OFFICE.

JOHN WILLIAM LATIMER, OF CLEVELAND, OHIO, ASSIGNOR TO JOHNS-MANVILLE INCORPORATED, A CORPORATION OF NEW YORK.

WATER-TIGHT PIPE-CONDUIT.

1,371,632. Specification of Letters Patent. Patented Mar. 15, 1921.

Application filed November 9, 1918, Serial No. 261,892. Renewed August 9, 1920. Serial No. 402,301.

*To all whom it may concern:*

Be it known that I, JOHN W. LATIMER, a citizen of the United States of America, residing at Cleveland, county of Cuyahoga, State of Ohio, have invented certain new and useful Improvements in Water-Tight Pipe-Conduits, of which the following is a specification.

My invention relates more especially to conduits for steam pipes, which conduits are designed to be filled with non-heat conducting materials for the purpose of reducing the loss of heat by radiation from the pipes. Usually these conduits of this description have been formed of earthenware tiles or cement pipes, or other form of sewer pipe, the sections of which have been more or less carefully cemented together at their meeting edges. When conduits of this construction are laid in swampy ground the water infiltrates, soon soaking the non-conducting filling and destroying the insulating properties of the structure. My present invention avoids this difficulty by producing a simple, fairly cheap conduit which can be laid as rapidly and easily as the cement tile and which is absolutely water-tight. The best form of apparatus at present known to me embodying my invention is illustrated in the accompanying sheet of drawings in which—

Figure 1:
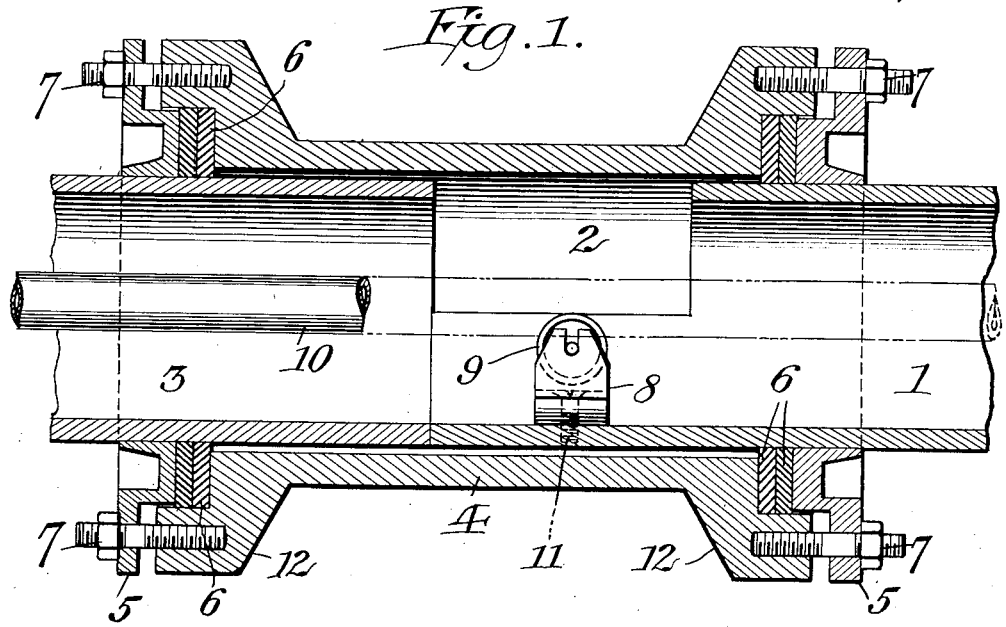
Figure 2:
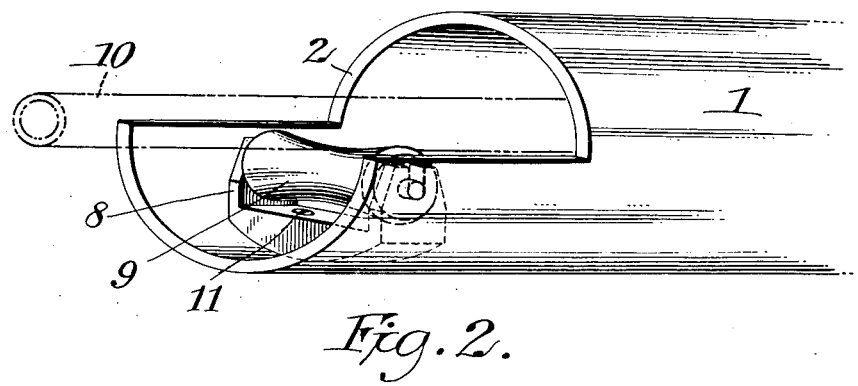

Figure 1 is a vertical central section of a fragment of a conduit made in accordance with my invention, and Fig. 2 is a perspective view of one of the conduit sections, with parts broken out.

Throughout the drawings like reference characters indicate like parts. 1 and 3 represent adjacent integral, cylindrical sections of pipe of some suitable material, such as cast iron. One end of each section is cut away, as at 2, to a substantially uniform extent, to give access to the interior of any conduit formed by placing together a plurality of such pipe sections. 4, is a sleeve, preferably made of cast or wrought iron, each end of which has a recessed flange 12, in which a gland 5, may be held by bolts 7, 7, to form a stuffing box and forced down on 6, 6, the contained metallic or other packing to form a mechanically strong and liquid tight joint with the outer surfaces of conduit sections 1 and 3, thus uniting adjacent sections together and covering the opening 2.

8, is a roll frame or housing usually of cast metal in which the pipe supporting roller 9, is journaled to form an antifriction support for the steam or hot water pipe 10. The roll frame 8, is fastened to the conduit section in any convenient manner, as by screws 11, in the position shown, under opening 2. Other forms of pipe supports might obviously be substituted.

In use, the conduit sections 1, 3, are laid in trenches on suitable foundations, a sleeve 4, is slipped over each section so as to leave opening 2 exposed. The rolls 9, are then put in place and the pipe or pipes 10, are connected up through the conduit sections, resting on the rolls. Any suitable heat insulating material is packed into the conduit around the pipe and the sleeves 4, slid along to cover the openings 2, and conduit joints. The parts being then in the positions shown in Fig. 1, the glands 5, 5, of the stuffing boxes are screwed down, and the trench filled in.

The result is a strong, water-tight conduit composed of sections united by water-tight joints. By reversing the last above described operations access to the conduit interior for inspection or repairs can be easily obtained at any time.

The special advantages of the invention arise from the dual function of the sleeved stuffing box construction which both makes the conduit joints water-tight and strong and forms a firmly held, but easily removable cover for opening 2.

Having described my invention, I claim:

1. In a conduit for steam pipes and the like the combination, with a series of integral cylindrical sections each having a cutaway portion of substantially uniform size near one end and a pipe support in the interior of each section below said opening, of sleeves surrounding the meeting ends of the conduit sections and covering the described openings, and means for producing water-tight and mechanically strong joints between the ends of the sleeves and the respective conduit sections.

2. A combination such as set out in claim 1 in which the means for fastening the joints comprises recessed flanges on each sleeve end, packing in said recesses, glands coöperating with the flanges to form stuffing boxes, and means for forcing the glands into, and holding them in the recesses against the packing.

JOHN WILLIAM LATIMER.

Witnesses:
F. J. Guy,
Geo. D. Waters.